US012746100B2

(12) United States Patent
Toscano et al.

(10) Patent No.: US 12,746,100 B2
(45) Date of Patent: Sep. 29, 2026

(54) DENTAL / PROSTHETIC IMPLANT

(71) Applicants: Elisandro R. Toscano, Orange, CA (US); Michael B. Frankel, Valley Village, CA (US); Yahya Mansour, Dallas, TX (US); Malek K Mansour, Irvine, CA (US); Saam Zarrabi, Fort Worth, TX (US)

(72) Inventors: Elisandro R. Toscano, Orange, CA (US); Michael B. Frankel, Valley Village, CA (US); Yahya Mansour, Dallas, TX (US); Malek K Mansour, Irvine, CA (US); Saam Zarrabi, Fort Worth, TX (US)

( * ) Notice: Subject to any disclaimer, the term of this patent is extended or adjusted under 35 U.S.C. 154(b) by 235 days.

(21) Appl. No.: 18/395,560

(22) Filed: Dec. 23, 2023

(65) Prior Publication Data

US 2024/0122681 A1 Apr. 18, 2024

Related U.S. Application Data

(63) Continuation-in-part of application No. 17/376,656, filed on Jul. 15, 2021, now abandoned.

(51) Int. Cl.
*A61C 8/00* (2006.01)

(52) U.S. Cl.
CPC .......... *A61C 8/0054* (2013.01); *A61C 8/0022* (2013.01); *A61C 8/0069* (2013.01)

(58) Field of Classification Search
CPC ... A61C 8/0054; A61C 8/0022; A61C 8/0069; A61C 8/0086
See application file for complete search history.

(56) References Cited

U.S. PATENT DOCUMENTS 4,744,756 A 5/1988 Ross
4,854,872 A 8/1989 Detsch
(Continued)

FOREIGN PATENT DOCUMENTS

EP 2021041 2/2009
EP 2021041 B1 * 12/2009 ............. C22C 14/00
(Continued)

OTHER PUBLICATIONS

Achtermann Translation (Year: 2009).*
Tamura Translation (Year: 1994).*

*Primary Examiner* — Eric J Rosen
*Assistant Examiner* — Luis Ruiz Martin
(74) *Attorney, Agent, or Firm* — The Law Office of Austin Bonderer, PC; Austin Bonderer

(57) ABSTRACT

Improvements in a dental/prosthetic implant are disclosed. The implant includes interior and exterior threaded surfaces. The use of both interior and exterior expanding threaded surfaces for integrations of the insert and a prosthetic with the same implant. The implant is immediately usable under load and promotes rapid integration with bone growth. The expanded insert essentially contacts the tapped bone surfaces where loads can be immediately applied so a person can utilize the prosthetic implant. The implant can further include security devices GPS, ID with medical records making removal of the implant difficult to extract. A cushioning member may be further integrated. The implant/abutment can include a surface with a plurality of contacts with sufficient gold contact points to attach residual nerve endings, during implanting surgery to provide nerve identification, send, receive, target to exploit proprioceptive memory or retraining.

17 Claims, 11 Drawing Sheets

(56) References Cited

U.S. PATENT DOCUMENTS

| | | | | | |
|---|---|---|---|---|---|
| 4,938,693 | A | | 7/1990 | Bulakiev | |
| 4,960,381 | A | | 10/1990 | Niznick | |
| 5,171,324 | A | | 12/1992 | Campana et al. | |
| 5,387,239 | A | | 2/1995 | Bianco et al. | |
| 5,439,381 | A | * | 8/1995 | Cohen | A61C 8/0033 433/177 |
| 5,690,843 | A | | 11/1997 | Schmitt et al. | |
| 5,733,122 | A | | 3/1998 | Gordon | |
| 5,833,463 | A | | 11/1998 | Hurson | |
| 6,190,169 | B1 | | 2/2001 | Bluemli et al. | |
| 6,213,775 | B1 | | 4/2001 | Reipur | |
| D446,859 | S | | 8/2001 | Hurson | |
| 7,059,855 | B2 | | 6/2006 | Zickman et al. | |
| 7,850,452 | B2 | | 12/2010 | Suttin et al. | |
| 2001/0019816 | A1 | | 9/2001 | Kumar | |
| 2004/0046229 | A1 | | 3/2004 | Sundt et al. | |
| 2004/0175673 | A1 | | 9/2004 | Zickman et al. | |
| 2006/0014120 | A1 | | 1/2006 | Sapian | |
| 2008/0004626 | A1 | | 1/2008 | Glazer et al. | |
| 2008/0220394 | A1 | | 9/2008 | Berckmans et al. | |
| 2009/0136898 | A1 | | 5/2009 | Kim | |
| 2010/0285427 | A1 | | 11/2010 | Hung | |
| 2013/0006356 | A1 | * | 1/2013 | Cook | A61F 2/78 623/16.11 |
| 2016/0045160 | A1 | | 2/2016 | Keating et al. | |
| 2016/0278886 | A1 | * | 9/2016 | Greenberg | A61C 8/0019 |
| 2016/0302893 | A1 | * | 10/2016 | Vukas | A61C 8/0012 |
| 2016/0317262 | A1 | | 11/2016 | Stobbe et al. | |
| 2018/0036053 | A1 | * | 2/2018 | Toscano | A61F 2/72 |

FOREIGN PATENT DOCUMENTS

| | | | | |
|---|---|---|---|---|
| JP | H06105899 | | 4/1994 | |
| JP | H06105899 A | * | 4/1994 | A61F 2/30767 |
| KR | 102028726 | | 7/2019 | |

* cited by examiner

DENTAL / PROSTHETIC IMPLANT

CROSS-REFERENCE TO RELATED APPLICATIONS

This application claims the benefit of Provisional application Ser. No. 17/376,656 filed Jul. 15, 2021, the entire contents of which is hereby expressly incorporated by reference herein.

PRIOR ART

U.S. Pat. No. 4,960,381 issued to Gerald A. Niznick on Oct. 2, 1990, discloses a Screw-Type Dental Implant Anchor. The dental implant anchor includes an externally threaded body portion having internal structure for engaging an insertion tool. The body portion can be joined to a top portion having an unthreaded exterior wall. This internal is inside a top portion or inside the body portion of the anchor. While this type of dental implant is insertable into a bone, the anchor has a fixed outside diameter and requires bone grown to anchor the implant.

U.S. Pat. No. 6,464,500 issued to Don D. Popovic on Oct. 15, 2002, discloses a Dental Implant and Abutment System. The system uses a dental implant anchor that includes an external body surface that can have threads or be non-threaded and a uniquely designed internal portion for engaging screws, abutments, and insertion tools in one step. The system uses tapered threads and one-way barbs to temporarily secure the implant into the bone while the bone grows around the implant. This type of dental implant also has a fixed outside diameter and requires bone grown to anchor the implant.

U.S. Pat. No. 7,059,855 issued to Albert Zickman et al., on Jun. 13, 2006, discloses a Dental Implant System. The system dental implant system includes a dental implant having an external thread for threading into bone and an internal thread for attachment of a prosthesis. The internal thread has a plurality of notches which accept a complimentary shaped insertion tool.

U.S. Pat. No. 5,171,324 issued to Donna L. Campana on Dec. 15, 1992, discloses a Prosthetic Hip Stem Implant with Torque Adapter. The prosthetic hip stem implant and torque wrench adapter. The hip stem includes an extraction bore formed through its body and a plurality of recessions formed in the body upper surface. A lip extends outwardly of the body and includes alignment indicia for visually aligning the implant during seating. While this prosthetic operates as a bone/joint replacement the shaft is smooth and requires bonding and/or bone growth to bond to the bone.

What is needed is a dental/prosthetic implant that self-expands into the bone to secure the implant upon installation. The implant should further include internal threads for engaging a prosthetic. The prosthetic should also include contacts for connecting to nerves to allow for an articulatable prosthetic. The proposed dental/prosthetic implant provides the solution.

BACKGROUND OF THE INVENTION

Dental implant complications are generally related to poor planning, improper diagnosis, or inappropriate treatment options. The most common complications are inflammation or infection of the implant, bone or gum tissue loss, aesthetic issues, and functional problems.

A dental implant may heal poorly and lose integration due to several reasons including, but not limited to inflammation or infection following surgery, poor bone quality, inadequate amount of bone, micro-motion from loading the implant too early, poor surgical technique during placement, poor stability during placement, over preparation of the site, traumatic surgery with poor handling of bone and gum tissue, smoking, and poor oral hygiene.

For people with bad teeth, the only solution is with a dental implant. This is accomplished by inserting or bonding an anchor into the bone and then implanting a dental appliance onto the insert. Various devices and methods have been utilized to anchor the implant into the bone. A number of these require a period between insertion of the implant to allow the bone to grow around the implant. Prior art includes an external thread which is driven into the bone and an internal thread which accepts an insertion tool.

For prosthetic implants such as, but not limited to amputated appendages, hip replacement or other bone/joint replacements, the bone is cut off and an implant is inserted into the bone. It often takes time for the bone to grow around the insert. In the case of an amputee, the appendage is missing, but the nervous system is intact in the remaining portion of the body. The nervous system includes connections for muscle control and touch/feel receptors. Connection from the disconnected nervous system to a prosthetic will allow the amputee to operate and feel objects using the same nervous system connections that originally existed.

SUMMARY OF THE INVENTION

It is an object of the dental/prosthetic implant to include interior and exterior threaded surfaces. The use of both interior and exterior threaded surfaces allows for both integration of the wire thread insert and a prosthetic with the same implant. The wire thread insert is also found under the registered names of Helicoil®, Spiralock® or similar threaded insert can be coiled into a hole in a semi-coiled configuration. Once the insert is threaded into the bone, the insert can expand into the hole.

The 60-year proven efficacy of a wire thread insert's fit when used as a dental implant during the healing process can ameliorate the propensity for standard implants to fail under these conditions or effects. The reason for this is a wire thread insert provides superior disbursed loading, avoiding micro motion, promoting adhesion and stability. Any normal solid threaded implant, like all screws have around 20% adhesion, hence poor stability. Any motion and or poor fit can lead to failure during the healing process. The consequences can be severe to create or restore a positive outcome. It is well established that wire thread insert adhesion is 70% or better and loading and stability as well are commensurate with that advantage. When high precision wire thread insert implants are used these vectors can approach 90% efficacy.

It is an object of the dental/prosthetic implant for the implant to be immediately usable under load. The expanded insert essentially contacts the tapped bone surfaces where loads can be immediately applied so a person can utilize the prosthetic implant.

It is an object of the dental/prosthetic implant to be fabricated from a material that allows rapid integration with bone growth. Surface treatment or plating can be imparted into or onto the insert. Some materials or plating improve and/or accelerate bone growth, modeling, and remodeling.

It is another object of the dental/prosthetic implant to include a magnetic repulsion cushion that allows for some cushioning of movement to the tooth when chewing or biting down. The magnetic repulsion uses two opposing magnets in a housing to provide an initial resistance to pressure and further cushions based upon the proximity of the opposing magnets to each other.

It is another object of the dental/prosthetic implant to overcome a crippling defect in biological tissue. This system can achieve that as a permanent fix easily maintained. through proper hygiene and in very rare cases adjustments which flexible coil inserts lend themselves too unlike solid implants best described as a traumatic insult prone to exacerbating biological problems and inherent defects in a typical solid immovable implant.

It is another object of the dental/prosthetic implant to operate with human and/or animal bone. The implant is not restricted to humans and can be equally inserted into animals to replace a damaged/missing limb, appendage, or tusk. The implant allows nearly full mobility to return where an animal can be returned to service or returned to its prior location or habitat.

It is another object of the dental/prosthetic implant to include security devices GPS, ID with medical records, miniature transceivers in hi risk and targeted individuals as well as military hostile environment field work could be more securely attached to bone, Difficult to detect extract.

It is another object of the dental implant to provide an efficacious delivery system of medications for over a hundred diseases prevalent in the third world falls into four categories: Bacterial, Fungal, Protozoan, and Viral. Contagious transmission is rampant due to generally poor health, compromised immune systems, airborne, contaminated water, and food, and poor management of sewage and trash. Most are treatable or preventable with myriad vaccines that establish immunity or kill off the offending pathogens, establishing a level of immunity as well.

It is another object of the dental implant to by using a simple implant of drill and insert the Spansule containing the time-release vaccines and medication requiring a serial treatment is automatically delivered. The choice of medications could be designated by the endemic diseases prevalent in a particular area in seasonal outbreaks and inserted into a hollow body of the implant. The surgical procedure of extracting an infected tooth, drilling, and tapping a jawbone, screwing in an implant, dropping in vaccine and medication pressure sensitive time release Spansule, capping with a shock absorbing and pumping abutment, and crown and is not a particularly complicated procedure and health care workers could be trained to do them quickly.

It is another object of the dental/prosthetic implant to include a cushioning member as an interface between abutment and the end of a wire thread insert to compresses without extruding to absorb pressure, shock. The cushion would mimic the shock absorbing properties of periodontal ligaments. Their efficacy in absorbing shock in leg prosthetics, walking running climbing is obvious.

It is still another object of the dental/prosthetic implant to form a base to attach a prosthetic on an amputee. The implant would have both Osseo integrated wire thread insert surrounding a percutaneous tapered implant, and external hollow shaft with and internal wire thread insert to which an abutment can be attached capable of supporting multiple interfaces. The multiple interfaces can be changed at upgraded as technology and need changes to provide optimal benefit the amputee. The internal/external abutment which allows for surrounding residual muscle to be attached and used to activate mechanical prosthetic arms, hands, or feet.

It is still another object of the dental/prosthetic implant to include a surface with a plurality of contacts with sufficient gold contact points to attach residual nerve endings, during implanting surgery to provide nerve identification, send, receive, muscle control, fatigue, temperature, angle, touch to exploit proprioceptive memory or retraining.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1B:
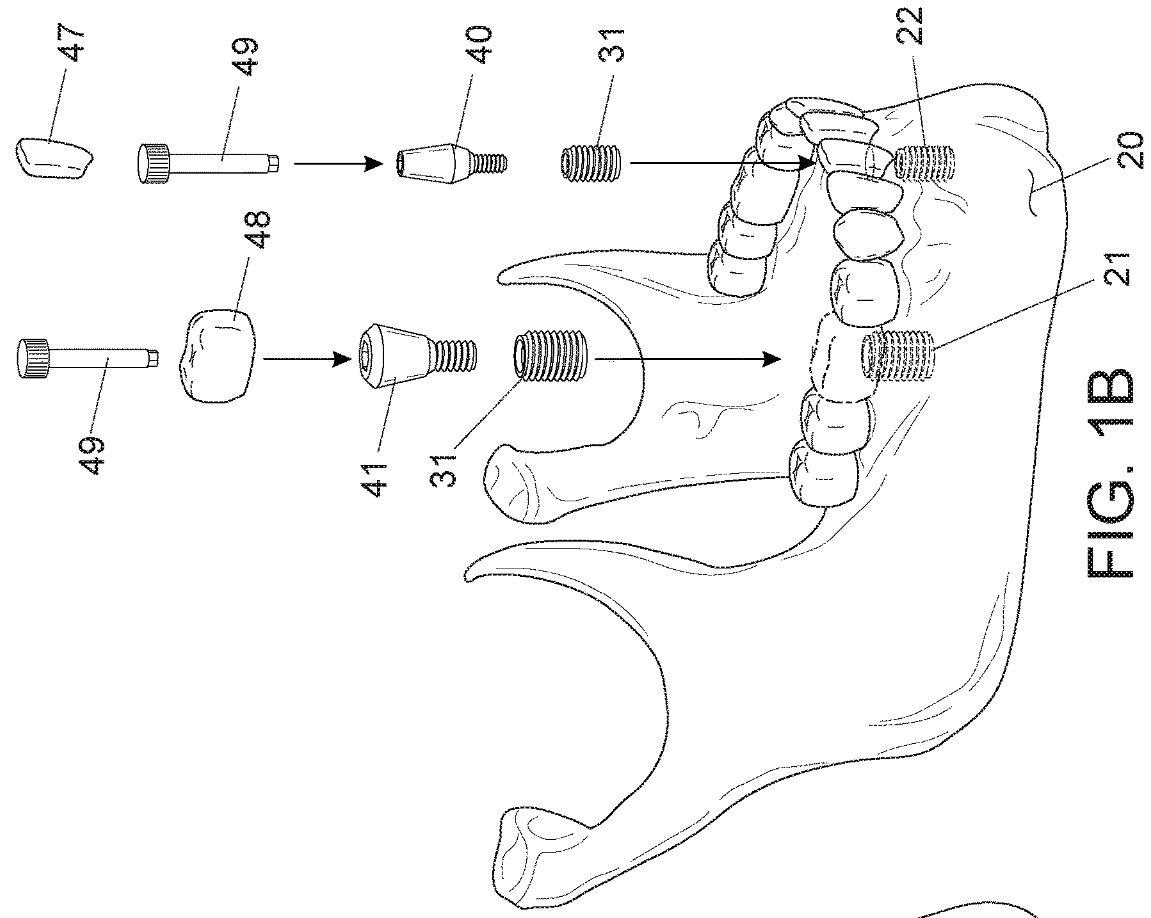
FIG. 1B Prior Art
FIG. 1B shows a second perspective view of a jawbone with dental implants.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

| Item Numbers and Description | |
|---|---|
| 20 jawbone | 21 hole |
| 22 insert | 24 threaded insert |
| 25 threaded insert | 26 system |
| 27 one-piece stud | 28 base |
| 30 wire threaded insert | 31 wire threaded insert |
| 32 wire threaded insert | 33 magnetic shock absorber |
| 34 magnetic base | 35 top magnet |
| 36 lower magnet | 40 abutment |
| 41 abutment | 42 abutment |
| 45A-45U abutments | |
| 46 top mounted base | 47 implant |
| 48 molar/crown | 48A, B molar |
| 49 screw | 50 implant |
| 51 osseointereated insert | 52 skin/implant interface |
| 53 percutaneous implant | 54 insert |
| 55 abutment | 56 fastener |
| 60 vertebra | 60A, B, C bones |
| 61 screw | 62 head |
| 63 rod(s) | 64 insert |
| 70 foot | 71 control muscles |
| 72 nerves | 73 computer |
| 74 display | 79 Spansule |
| 80 device | 81 nerve simulator |
| 82 lower molar | 83 monopolar probe |
| 84 insert | 85 micro holes |
| 86 inserted | 87 gum line |
| 88 top-mounted base | 89 motion/movement |
| 90 person | 91 cerebral cortex |
| 92 limbic forebrain | 93 thalamus |
| 94 cerebrum/brain | 95 pathway |
| 96 hypothalamus | 97 paleospinothalamic pathway |
| 98 brain stem | 99 spinal nerve |
| 100 spinal cord | 101 pain receptors |
| 110 data | 111 CS data alone |
| 112 new response | 114 left hand |
| 115 right hand | 120 base control module |
| 121 replacement arm | 122 wrist |
| 123 load | 124 fingers |

Figure 1A:
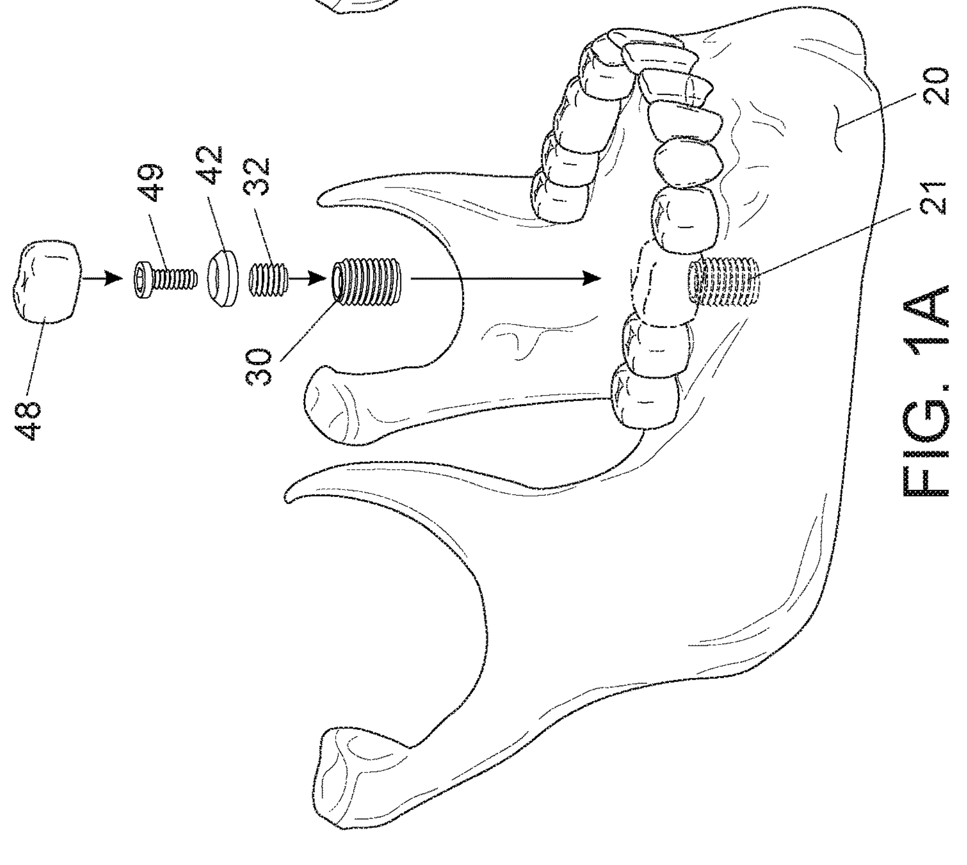
FIG. 1A Prior Art
FIG. 1A shows a first perspective view of a jawbone with a dental implant.

FIG. 1A shows a first perspective view of a jawbone 20 with a dental implant and FIG. 1B shows a second perspective view of a jawbone 20 with dental implants. The dental implant in these figures is a wire threaded insert 30. Wire threaded inserts 30 are also known as registered trademarks as Helicoils®, Twinserts®, Tanged, & Tangless and others. The wire threaded inserts are for use in allopathic medicine with a primary application in a superior kind of dental implant(s) in human and veterinary medicine. and wherever attachment to bone of any material is indicated. Medical training, fossil assembly, art, jewelry, etc. The wire threaded insert 30, 31 is a proven device for superior threaded attachment/connector function since 1938 and as per the wire threaded insert 30, 31 a suggested allopathic remedy (i.e., dental implants) would also prove superior because of the proven technical advantages as well as vastly improving current dental implant technology.

Its established and proposed advantages are numerous including but not limited to wire threaded inserts are stronger and longer lasting especially when making materials of different media. A mechanically tapped hole 21/22 in general, will exhibit a surface roughness eight times more than the surface of a wire threaded insert 30, 31 which will overcome surface contact disparity via very tight tolerances and increased clamping action including self-adjustment when receiver medium (i.e., bone) deteriorates.

A medical grade titanium wire threaded insert dental implant is mostly inert, anti-corrosive, anti-magnetic, withstands extremes of pressure, temperature, acidity, and stress as is typical of wire threaded insert behavior in general. Such conditions are resident in the human/animal mouth. Bolt failure and thread stripping is reduced due to torque, resident and progressive pitch angle errors, pressure, stress, and movement.

Typical thread clamping is up to 70% at the two threads at the collar leaving the tolerances fit highly diminished over the majority of the thread's length. Pitch errors and rough contact greatly exacerbates the problem which continues to increase due to said forces, of stress, pressure, movement, temperature variance, material deterioration (i.e., bone). Wire threaded insert 30, 31 stretch compensates for these variables and distributes loading and clamping more evenly even when progressive pitch error occurs which can be expected in bone. Radial and axial elasticity allows the shearing load threshold (and bolt failure) to be converted to advantage by transformation to an advantageous radial load fit (hoop stress) evenly distributing the loading over the entire length of the threads. Bolt breakage, cracking, thread shearing is virtually eliminated though bone tissue in the mouth can be expected to exert conditions which become problematic in a typical dental implant causing the wire threaded insert 30, 31 to respond to improve the fit.

Medical grade titanium is known to Osseo integrate further enhancing improved and self-adjusting fit of a dental implant using said material achieving tremendously improved integration via all the advantages of properly engineered wire threaded insert 30, 31. This is an extraordinary phenomenon in which intrinsic problems with current dental implant can be overcome via wire threaded insert 30, 31 advantages and osseo integration in combination.

Metal medical devices which reside in the body must be inert and not react to conditions in the body. Metal grade titanium alloys are the metal of choice. Developments in metallurgy seek to improve the inert characteristics of titanium via nano structuring eliminating possible aged material leaking of toxic alloyed metals. Under certain diagnostic conditions a thin coating of zirconium oxide could be applied to the wire threaded insert 30, 31 in a specialized wire threaded insert 30, 31 where alloyed metals leakage might be a concern, environmental sensitivities, allergies, compromised immune systems, etc. The use of nanotechnology to alter granularity at nanoscale specifically to produce inert medical grade titanium wire thread insert excluding toxic alloys without and improving behavior characteristics and weight. In some cases, bone to metal osseointegration of implants between bone and metal is with a glue with a thickness of about a molecule. In a sense, a wire threaded insert 30, 31 is a storehouse of potential energy as expressed as function of a linear spring as described in the below equation:

$$U(x)-\frac{1}{2}kx^2$$

Measured as an SI (derived energy potential) micro joule (the millijoule (mJ) is equal to one thousandth (10-3) of a joule.) It is this potential energy which makes the wire threaded insert 30, 31 dental implant a dynamic self-adjusting, self-correcting, self-integrating, semi-permanent prosthetic device as to opposed to a standard dental implant which is a static prosthetic and in a given difficult environment (the mouth) problematic conditions arise or given enough time (life span of device) will itself become problematic and or fail necessitating replacement. Such quantitative measurements when related to the diagnostic properties of healthy and compromised bone will determine the spring strength to be chosen when choosing and implementing a wire threaded insert 30, 31 dental implants as an allopathic prosthetic virtually establishing a highly tuned relationship between the implant and the bone.

Where bone 20 is severely compromised or too thin walled a threaded bushing can be used instead of a wire threaded insert 30, 31 which would give strength and support but only when the bone mass is insufficient to receive the tiniest wire threaded insert 30, 31 which remains the preferred choice as bushings retain the same problems as a standard implant, though function as a prosthetic at least.

In these figures, the tooth or teeth are extracted. A hole is drilled to the minor diameter for the wire threaded insert 30, 31 to a desired depth. The drilled hole is tapped using a bottom tap. The wire threaded insert 30, 31 is threaded into the tapped hole 21/22. If a tang is present in the wire threaded insert 30, 31, the driving tang is broken off or otherwise removed. The wire threaded insert 30, 31 is installed to a depth within the jawbone 20.

In FIG. 1A an inner wire threaded insert 32 is then installed. An abutment 40, 41 or 42 is then installed into the wire threaded insert. If the tooth is a molar 48 then a screw 49 is generally placed through the molar implant 48 and the head of the screw is then covered with a filling. If the tooth is an incisor 47 then the screw 49 is threaded into the abutment and the implant 47 is bonded to the screw 49. While the figure shows the implant in the jawbone, it can also be installed in the upper jawbone.

Figure 3:
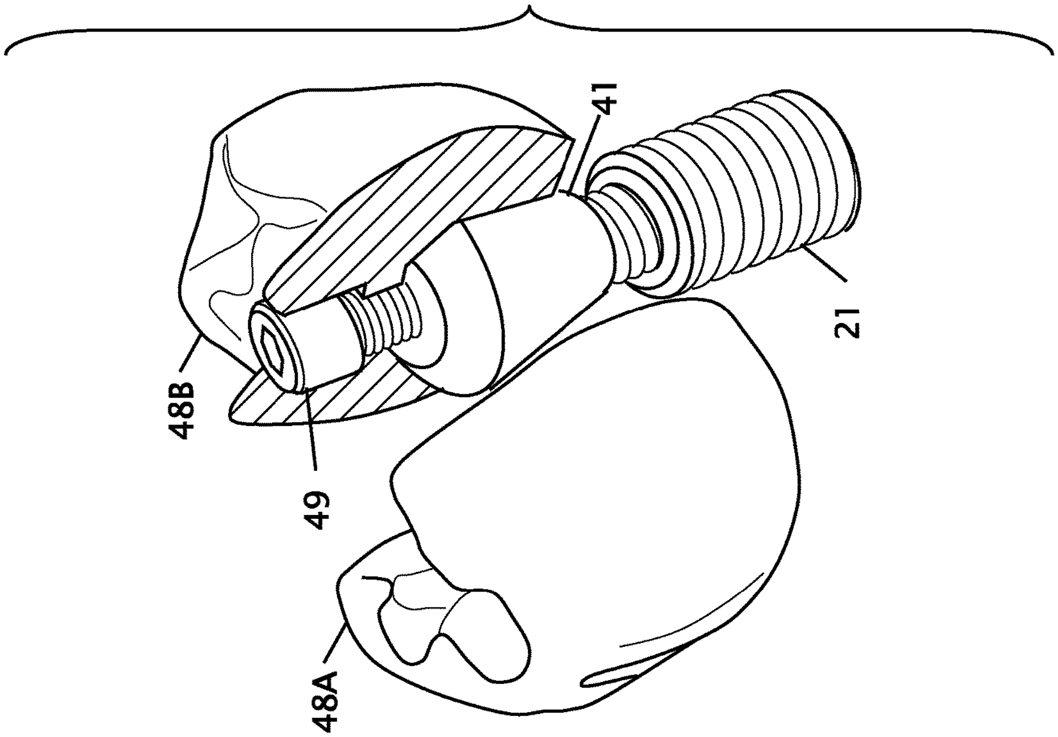
FIG. 3 Prior Art
FIG. 3 shows an assembled view of a bisected large molar with the wire threaded insert.
Figure 2B:
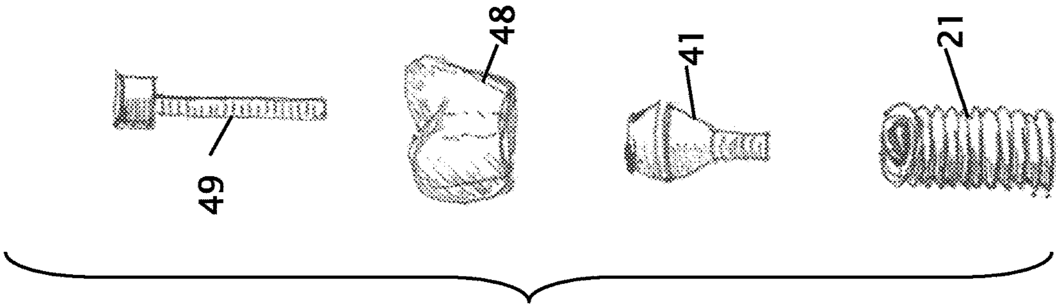
FIG. 2B Prior Art
FIG. 2B shows an exploded diagram of large molars with screws through the tooth.
Figure 2A:
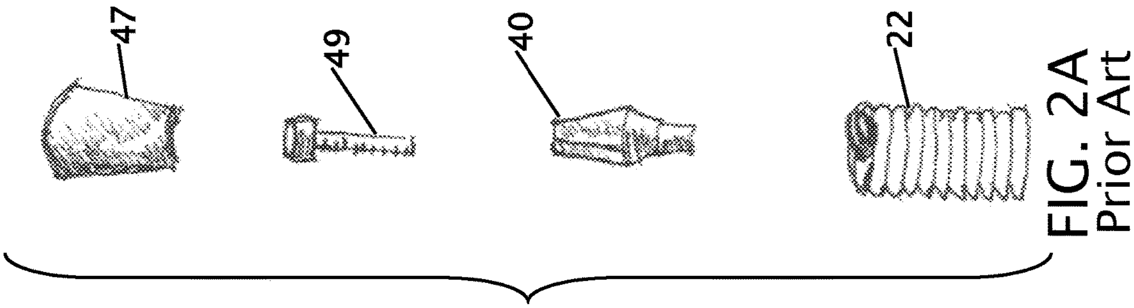
FIG. 2A Prior Art
FIG. 2A shows an exploded diagram of small incisors that are adhered to the abutment.

FIG. 2A shows an exploded diagram of small incisors that are adhered to the abutment, FIG. 2B shows an exploded diagram of large molars with screws through the tooth and FIG. 3 Shows an assembled view of a bisected large molar with the wire threaded insert. These embodiments are used with tangles free-running inserts, tangles screw-locking inserts, tanged free-running inserts and tanged screw-locking inserts 21/22. An abutment 40, 41 is installed into the wire threaded insert 21/22. If the tooth is a molar 48, 48A/48B then a screw 49 is generally placed through the molar implant 48, 48A/48B and the head of the screw is then covered with a filling. If the tooth is an incisor 47 then the screw 49 is threaded into the abutment and the implant 47 is bonded to the screw 49. While the wire threaded insert may be shown straight (not tapered) it is contemplated that the wire threaded insert can be tapered to be narrower at the base. The wire threaded insert is essentially square in cross-section but could have rounded edges to match the tap that is used to tape the bone.

Wire threaded inserts such as Spirallock® have a wedge ramp design that has been produced in wire thread inserts to offer the same vibration resistance and reusability while bringing higher strength and clamp load capability to titanium. The wire thread inserts are available in two styles: tanged and Drive Notch engineered with no tab. They are particularly effective in application for aerospace, electronics, and medical industries.

Figure 4:
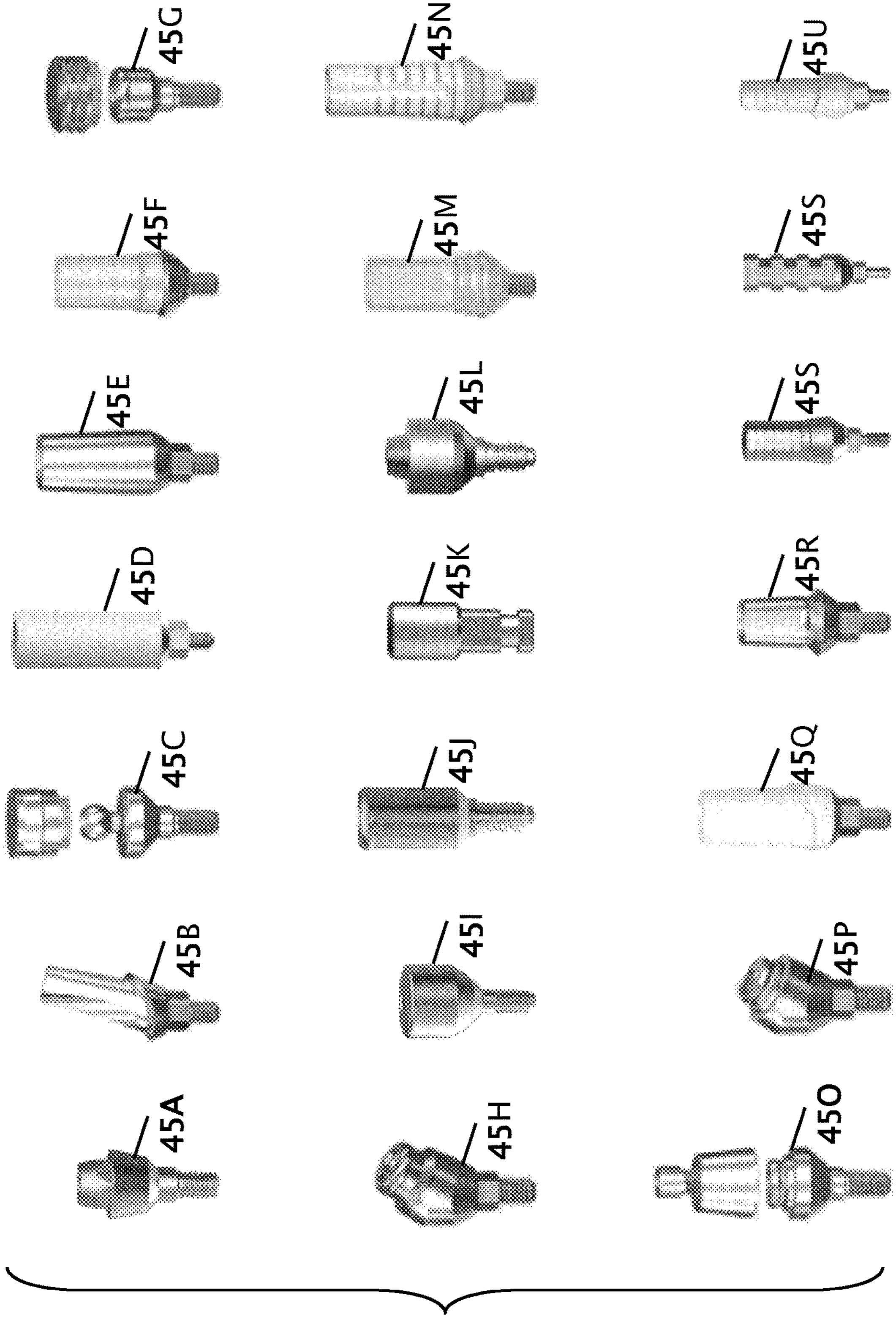
FIG. 4 Prior Art
FIG. 4 shows various abutment attachments.

FIG. 4 shows various abutment attachments. These abutments are for dental applications, but it is further contemplated that the abutments can have equivalent applications for prosthetic devices for limbs. The abutments in this figure include, but are not limited to aesthetic abutment 45A, angled contoured 45B, ball attachment abutment 45C, casting abutment 45D, full contour abutment 45E, gold/plastic castable abutment 45F, Global Positioning Satellite (GPS) abutment 45G, 15 and 30 degree GPS attachment abutment 45H, healing abutment 45I, locator abutment 45J, lab analogs abutment 45K, multi-unit abutment 45L, plastic non-engaging castable abutment 45M, plastic temporary abutment 45N, screw receiving abutment 45O, 15 and 30 degree screw receiving abutment 45P, straight contoured Zirconia/Titanium abutment 45Q, straight snap-on abutment 45R, Titanium abutment 45S, transfer abutment 45T and Zirconia abutment 45U. These abutments may further include a GLYD ring for compression absorption.

Numerous security devices GPS, RFID, ID with medical records, miniature transceivers in hi risk and targeted individuals as well as military hostile environment field work could be more securely attached to bone, Difficult to detect extract.

Implant technology has advanced significantly over the past years, there are ongoing issues with the loosening and fracture of implant screws. The load on the back teeth has been shown to be 50 to 80 kilograms, particularly for those who habitually grind their teeth. This application of high loads over prolonged periods has led to the failure of the implant screws, so improved fracture resistance would provide significant benefits for people who sometimes struggle with the maintenance of their implants.

Resorbable Implants

There is huge interest in biodegradable or bio-resorbable implants that gradually dissolve during the healing process, reducing the risks of inflammation and eliminating the need for repeat surgeries to replace or remove implants. Magnesium is a prime candidate for such resorbable implants as it is entirely biocompatible—and many people have a magnesium deficiency. Magnesium can dissolve too fast.

Research is assessing the advances that can be achieved in a range of metals when subjected to this process—some anticipated, such as increased strength, others unexpected, such as greater corrosion resistance and increased biocompatibility.

Metals are made of small crystallites, or grains. Applying mechanical load to deform the metal in specially designed processes breaks these into smaller and smaller fragments, down to a nanoscale granularity, while maintaining the material's overall structure. The more times the metal is pushed through the die, the smaller the grains become. The smaller the grains, the stronger the material, although there is a natural limit to both the reduction in grain size and the improved strength.

Titanium screws fixed into the jaw to hold artificial teeth, which have become a popular alternative to dentures. The screws are currently made of a titanium alloy that includes aluminum and vanadium to provide additional strength, but both elements are considered by some to be potentially toxic. Pure titanium is more biocompatible, but it doesn't have the strength of the alloy. However, we can take commercially pure titanium and use nano structuring to give the material o extra strength. This leaner, cleaner and stronger titanium compensates for the loss of the alloying elements.

Figure 5:
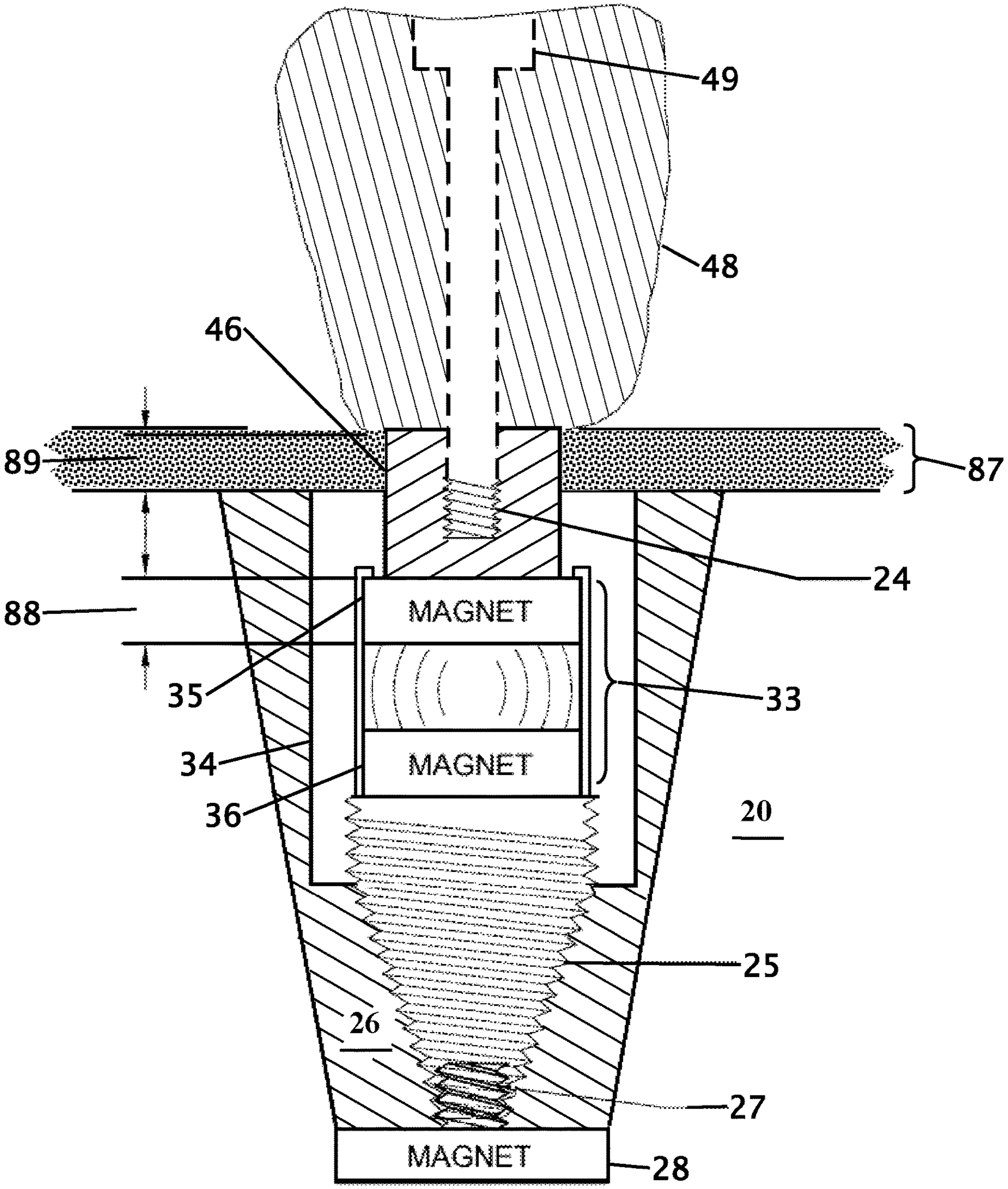
FIG. 5 shows a cross-section of a dental implant system that uses magnetic repulsion as a cushion.

FIG. 5 shows a cross-section of a dental implant system that uses magnetic repulsion as a cushion. This figure shows a tapered conical wire threaded insert 25 inserted in the drilled-out mandible or jawbone 20. The tapered conical wire threaded insert 25 is a medical-grade titanium alloy containing a measured amount of iron for extra strength and susceptibility to magnetic attraction and typical of dental drilled bone in preparation for an implanting in a conical hole. The wire threaded insert screws down onto a one-piece stud 27 and magnetic base 28 that is also medical grade iron alloy titanium and chemically welded firmly securing the conical tapered wire threaded insert 25 to the base 28. One end of the tapered conical wire threaded insert 25 is configured to thread into, one-piece stud 27, while the mid-section of the wire threaded insert 25 threads into the mandible 20 and the second end of the tapered conical wire threaded insert 25 is configured for the bottom of the magnetic base 36 to thread into.

The top of the tapered conical wire threaded insert screws onto the magnetic base 34 and lower magnet 36 of the magnetic shock absorber 33. This lower base/magnet 36 within the magnetic shock absorber 33 does not move. In addition to the wire threaded insert 25 being screwed onto the magnetic shock absorber base 33 it is also chemically welded to the base make it one piece. Magnetic shock absorber 33 has two internal magnets that are oriented to repel each other. This foundation, bottom magnet/stud 36, wire threaded insert and base magnet 36, within the magnetic shock absorber 33 are all chemically welded and magnetically bonded exhibits an extremely firm foundation that cannot move. The magnetic shock absorber 33 may be round with anti-rotation ribs, rectangular or other shape depending upon the installation.

Once osseointegration takes place the implant system (all three parts and the bone 20 becomes a single unit exhibiting irreducible complexity and a rock-solid foundation. The important effect of this is the desired motion 89 of the top magnet 35 and top-mounted base 46 does not affect the stability of the immovable foundation. This is critical to the motion of the magnetic shock absorber 33 moving precisely vertically (up and down), due to any side pressure from chewing, blows and tooth motion over time etc.

The crown 48 uses a countersunk hex screw 49 that screws down into a small wire threaded insert 24 within the top-mounted base 46 of the shock-absorbing abutment. The screw 49, wire threaded insert 24, and top-mounted base 88 are also chemically welded. All this bonding and coil adhesion, magnetic, chemically welded, and osseointegration produces a permanent implant system that includes a firm attachment and shock-absorbing capacity similar and perhaps better than a real tooth. The point of a prosthetic is to overcome a crippling defect in biological tissue. This system 26 can achieve that as a permanent fix easily maintained. through proper hygiene and in very rare cases adjustments which flexible coil wire inserts lend themselves too unlike solid implants best described as a traumatic insult prone to exacerbating biological problems and inherent defects in a typical solid immovable implant.

The magnetic shock absorber 33 provides limited cushioned movement 89 of the crown 48 from forces that squeeze said two internal magnets together as the top mounting base 46 is moved in the gum line 87 but could also pass-through flesh when used on a finger, leg, or arm. The repelling configuration of the two magnets provides increased repelling force as the two internal magnets are pushed together.

A Science Direct article S1742706121001902 indicates that orthopedic implants have heterogeneous porous structures and were known as ideal bone osteointegration. This research introduced the selective laser melting (sLm), finite element analysis (FEA), and a hydrothermal process (HT) for manufacturing a three-level heterogeneous porous structure. The macroporous structure was designed via CAD and micropores that were tuned via laser power regulation. A nano-size layer of hydroxyapatite crystals was coated by an HT process. The mechanical properties were reinforced via a core-shell structure with core reinforcement. The existence of micropores and nano-hydroxyapatite coating enhanced the in vitro proliferation of preosteoblasts and osteogenic cellular behaviors of rBMSCs. Thus, the three-level heterogeneous porous titanium implants could inspire researchers with potential clue of cyto-implant interaction mechanism, therefore building ideal orthopedic implants with accelerated osteointegration.

The porous structures of titanium implants play an important role in bone tissue regeneration; The geometrical environment influence cell behavior and bone tissue ingrowth in all macro-/micro-/nanoscale. In this study, a novel method to fabricate heterogeneous scaffolds and their macro-/micro-/nanoscopic structures were studied. A CAD model was used to obtain the macroscopic structure and the insufficient laser power was introduced for porous microstructure. Therefore, a layer of nano hydroxyapatite was coated via hydrothermal process. Cytoproliferation and cytodifferentiation results indicated that a integrity of regular/irregular, macro-/micro-/nanoscale porous structure had advance in recruiting stem cells and promoting differentiation. This research is beneficial to the development of bone implants with better bone regeneration ability.

Figure 6:
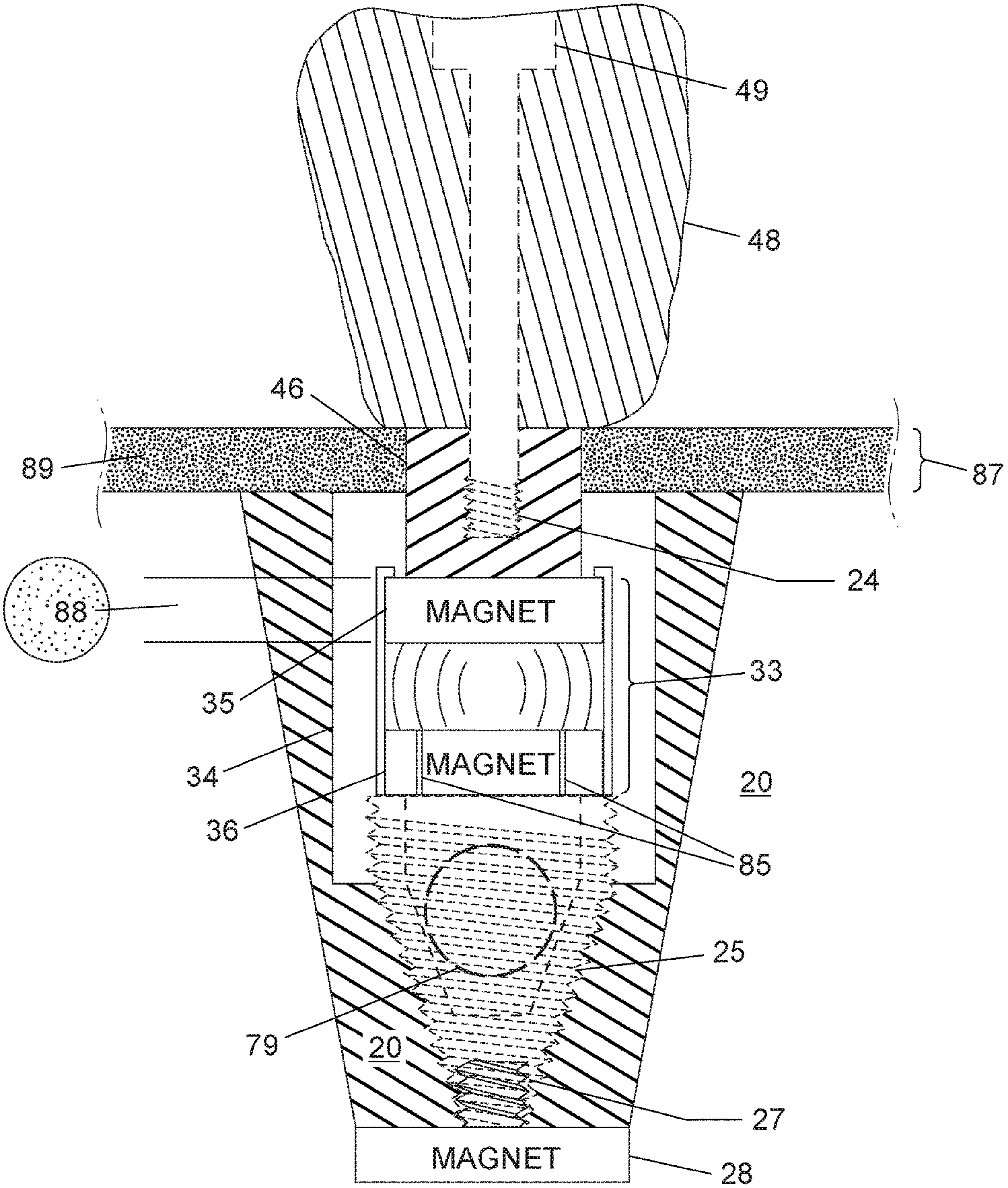
FIG. 6 shows a cross-section of a dental implant system with a Spangule capsule.
Figure 7:
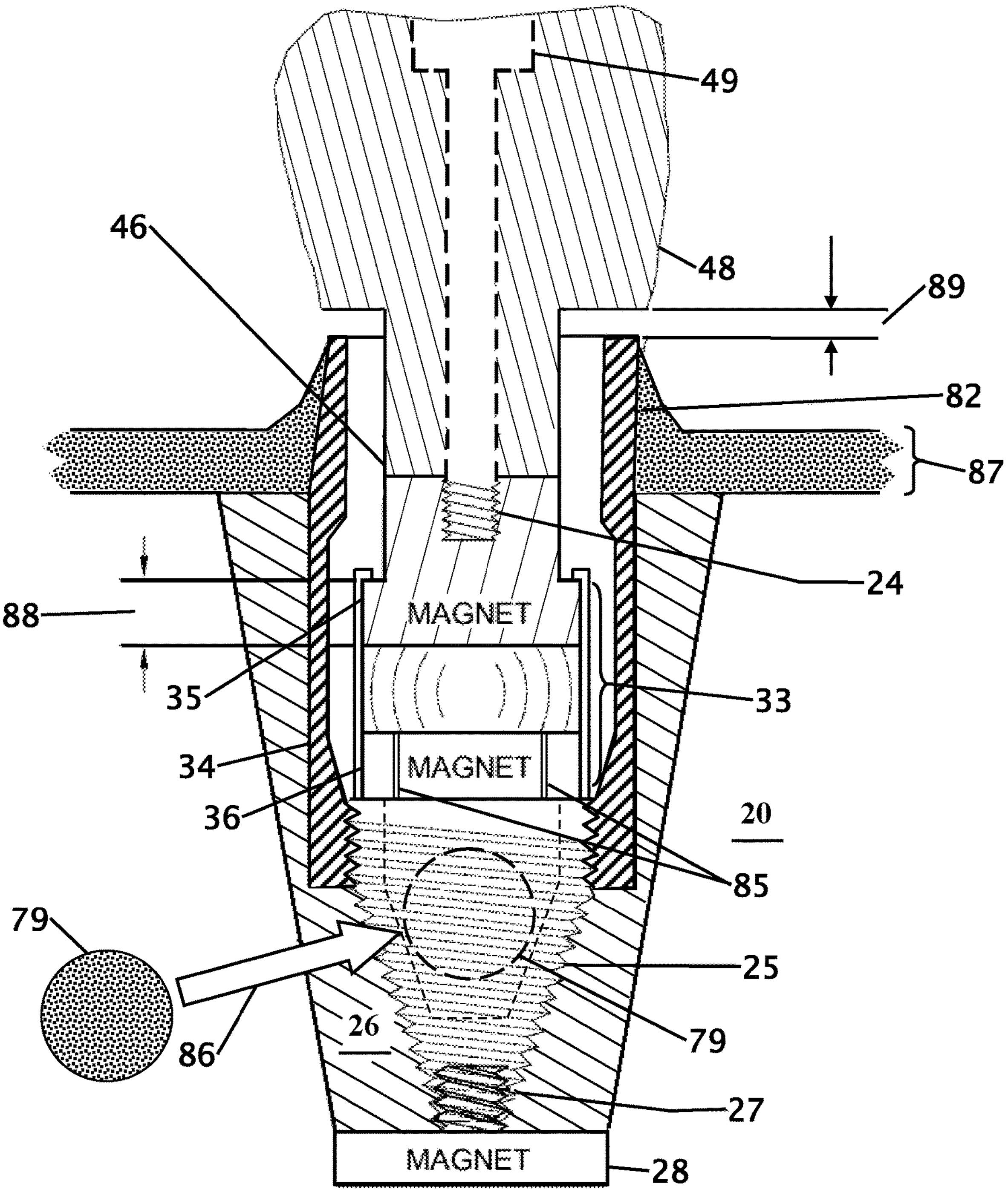
FIG. 7 shows a cross-section of a dental implant system with a Spangule capsule in another preferred embodiment.

FIG. 6 shows a cross-section of a dental implant system with a Spangule capsule and FIG. 7 shows a cross-section of a dental implant system with a Spangule capsule in another preferred embodiment. The lower magnet should illustrate some indication of 2 or 3 venturi drilled micro holes 85 through the lower magnet allowing increased air pressure from the upper magnet acting as a piston and putting pressure on the time release (slow decay) Spansule 79 thereby gradually the extruding immune stimulating bacteriostatic and bone growth stimulating osseointegration.

A crown 48 and magnetic shock-absorbing pumping abutment 33 can be popped off by dissolving the adhesive or unscrewed and fresh measured vaccines and medications are inserted sealed off and finished, Unmeasured and timed delivery of serial injections or swallowing medications according to a fixed schedule rarely work well in third-world populations, The all-purpose antibiotics such as Cipro and Amoxicillin are actually used as money and consumed in large doses (more is better) without regard for an effective schedule. Military and indigenous people can have dental implants for the control and implant as a vaccine and medication delivery system.

Overcrowded refugee camps, and/or semi-nomadic lifestyles make delivering treatment very problematic. To overcome resistance or incomplete serial treatments the medication delivery system in a tooth or bone implant could allow a slow infusion of drip as it were of vaccines and medication for as long as two years when encounters with a healthcare worker are not possible or overlooked when the subject is not well but feeling better. Toothache is extremely common and quickly overcomes resistance to seeking help and a simple implant of drill and insert the Spansule 79 containing the time-release vaccines and medication requiring a serial treatment is automatically delivered. The choice of medications could be designated by the endemic diseases prevalent in a particular area in seasonal outbreaks and inserted into the hollow body of the Helicoil® implant. The surgical procedure of extracting an infected tooth, drilling, and tapping a jawbone, screwing in an implant, dropping in vaccine and medication pressure sensitive time release Spansule 79, capping with the magnetic shock absorbing 33 and pumping abutment, and crown where health care workers are trained to install and replace the Spansule 79.

The crown 49 and magnetic shock-absorbing abutment 33 can be popped off by dissolving the adhesive or unscrewed 49 and fresh measured vaccines and medications are inserted sealed off and finished, Unmeasured and timed delivery of serial injections or swallowing medications according to a fixed schedule rarely work well in third-world populations, The all-purpose antibiotics such as Cipro and Amoxicillin are actually used as money and consumed in large doses (more is better) without regard for an effective schedule. Educated military not to mention uneducated indigenous people all do this.

In FIG. 7 the molar 48 is shown as a lower molar 82 where the gum line 87 seals the abutment. The upper molar/crown 48 passes into the upper magnet and is secured with a screw 49. There is an anti-rotation mechanism that keeps the upper molar 48 aligned with the abutment and the lower molar 82. Motion/movement 89 of the upper molar 48 pumps or draws medication of from the Spansule 79 to pass through the venturi drilled micro holes 85. Normal conversation or mouth movement and swallowing will generally not cause movement 89, but chewing food will cause the medication to be disposed.

Figure 8B:
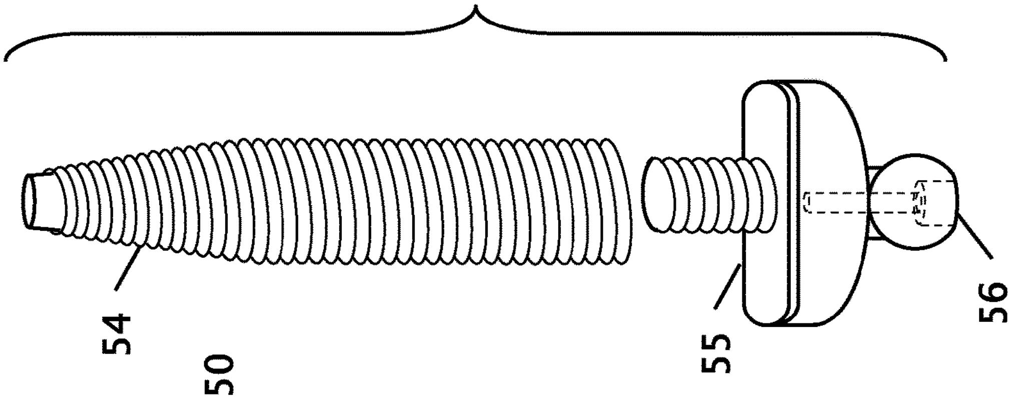
FIG. 8B Prior Art
FIG. 8B shows a wire thread Osseo integrated implant.
Figure 8A:
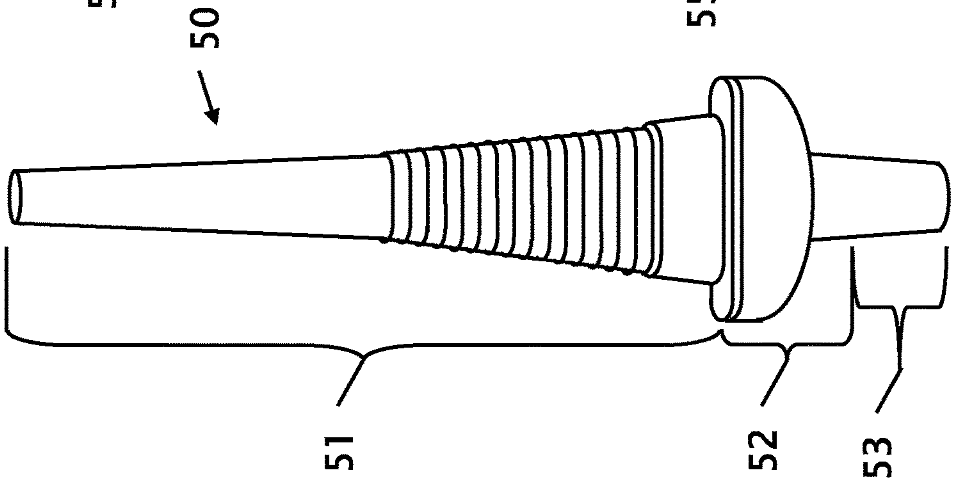
FIG. 8A Prior Art
FIG. 8A shows a common Osseo integrated implant.

FIG. 8A shows a common osseointegrated implant 50. The osseointegrated implant has a number of components of an osseointereated implant 51 that is inserted onto a bone. The hilt creates a skin/implant interface 52. The end of the skin/implant interface extends through the skin of the person or animal. The end of the osseointegrated implant 50 is a percutaneous implant 53.

FIG. 8B shows a wire thread osseointegrated implant. This implant can be scaled to accommodate the size of the bone from a leg bone to a finger or thumb. The osseointegrated implant has a wire threaded insert 54. This insert 54 shows a tapered end that is threaded into a tapped hole in a bone. The abutment 55 threads into the wire threaded insert 54. In this embodiment, the end of the abutment 55 has a ball. A threaded fastener 56 secures a prosthesis into or onto the ball.

Figure 9:
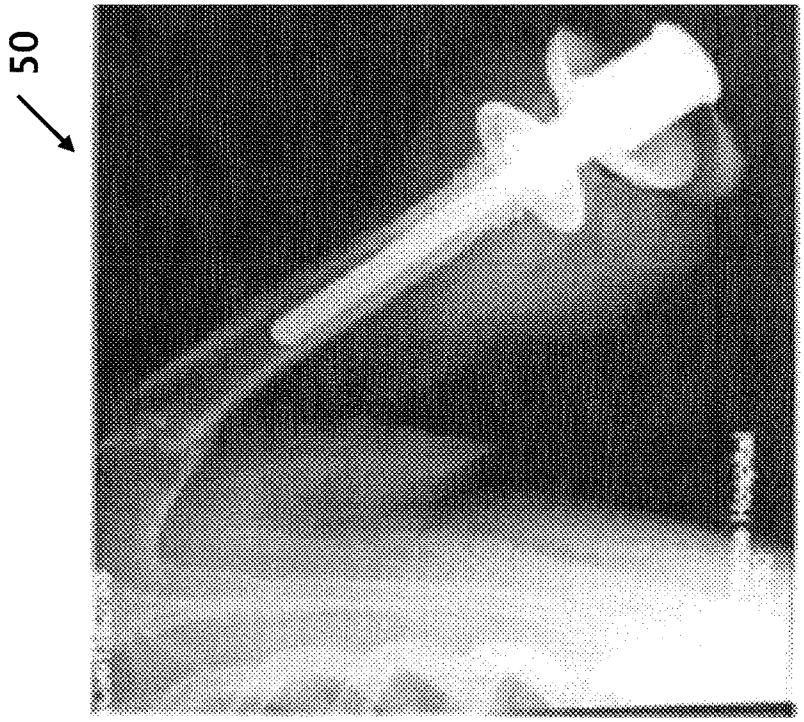
FIG. 9 Prior Art
FIG. 9 shows an X-Ray of an Osseo integrated implant.

FIG. 9 shows an X-Ray of an osseointegrated implant 50 on an arm where the arm has been severed above the elbow. There are several problems with socket-suspended prostheses. Most patients report a range of problems with the prosthetic socket. By surgically implanting a titanium screw into the residual bone, the prosthesis can instead be attached using a socket. The prosthesis always fits, always attaches correctly, and is always held firmly in place. Osseo integrated prostheses for the rehabilitation of amputees enhances the quality of life and offers a greater degree of freedom in everyday life. The advantages include:

A stable attachment for bone-anchored prosthesis is attached without using a socket, thereby ensuring stability. This also allows for the benefit of requiring a minimal time to attach the prosthesis.

amputation, but osseointegration is currently the best cosmetic option. Other alternatives are toe-to-finger transfer or the surgical creation of a thumb using the index finger.

Implant Surgery

The treatment consists of two operations with a three- to four-month interval. In the first operation, a specially constructed titanium screw (fixture) is installed in the residual bone. The period of hospitalization is usually about two to four days.

In the second operation, an abutment is added to the fixture. The abutment protrudes through the skin. The period of hospitalization is approximately two to four days, and you will only be able to undertake limited exercise according to your training program in the following weeks, thereby allowing the skin to heal.

Rehabilitation

When it comes to above-elbow amputation, loading of the bone can start (using a short training prosthesis) after the skin penetration area has healed, which is approximately three to six weeks after the second operation.

Everyday exercise is based on loads on the prosthesis on a standard set of scales. By gradually increasing the load, the strength of the bone will improve. Approximately twelve weeks after the second operation, a prosthesis can be fitted. In the case of below-elbow and thumb amputees, the movement of adjacent joints is exercised until the prosthesis is fitted.

There is normally a four- to six-month interval between stages one and two for trans humeral and transradial patients and four months for thumb patients. In a few selected cases where there is good bone quality, stages one and two have been performed simultaneously.

When it comes to trans humeral patients, a short training prosthesis is used three to six weeks after stage two, with increasing weights and loading until the patient reaches the weight of the final prosthesis. It could be a myo-electric, body powered or cosmetic prosthesis. No short training prosthesis is used for transradial or thumb patients.

Figure 10:
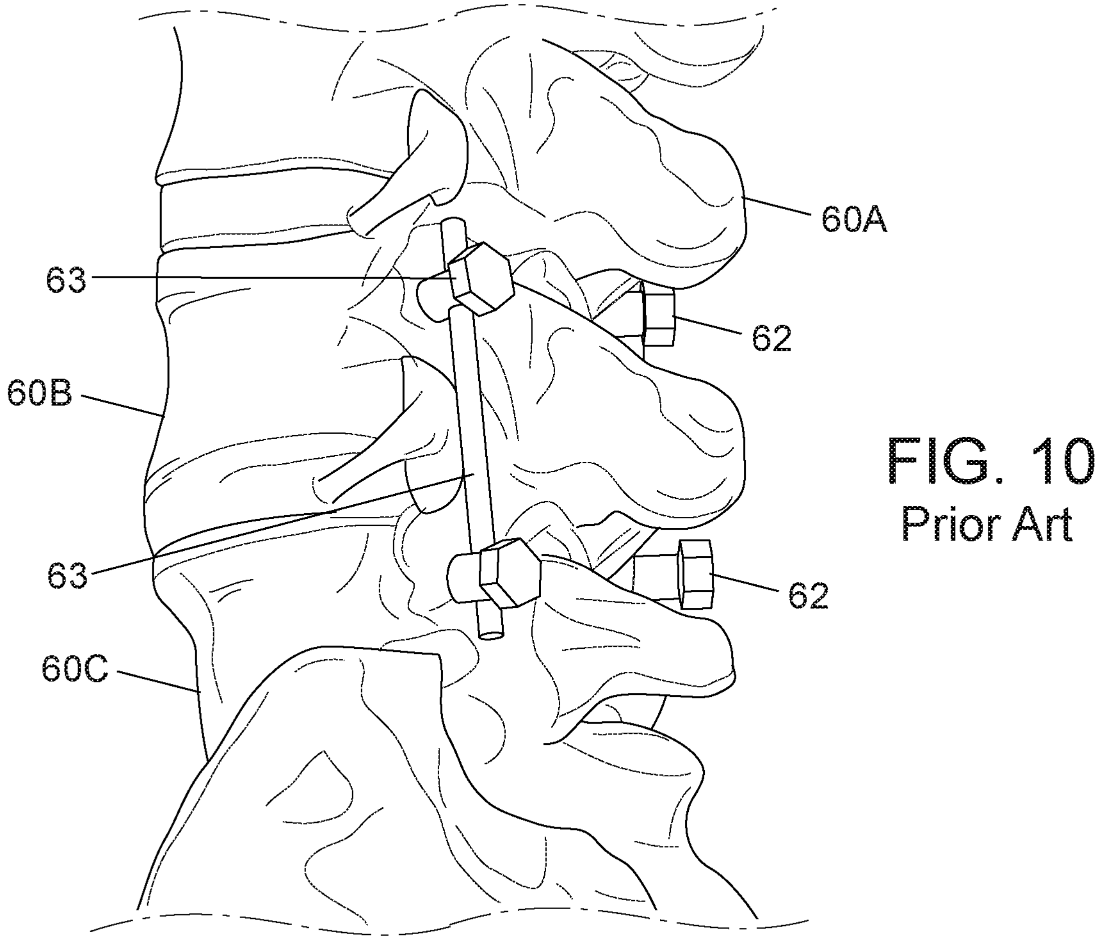
FIG. 10 Prior Art
FIG. 10 shows a spine with fusion surgery.

FIG. 10 shows a spine vertebra with fusion surgery. This fusion surgery joins one or more bones 60A, 60B, 60C into one solid bone. In this case 60B and 60C. This keeps the bones and joints from moving. In this procedure, the surgeon lays small grafts of bone over the back of the spine. Most surgeons also apply metal plates or rods 63 and screws 61, 62 to prevent the two spinal vertebrae 60B, 60C from moving. This protects the graft, so it heals better and faster.

Figure 11:
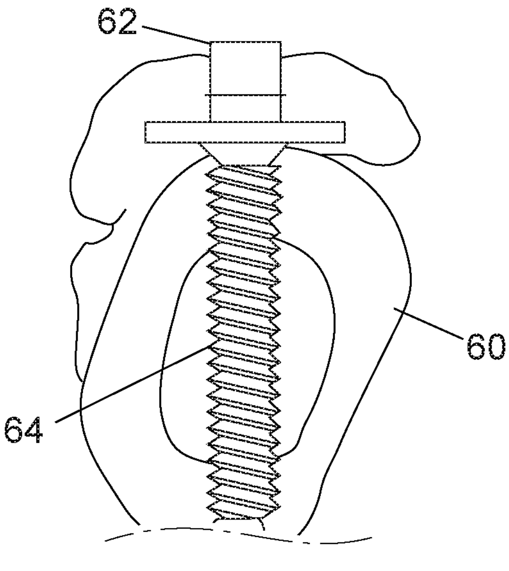
FIG. 11 Prior Art
FIG. 11 shows an X-Ray of an implant through a spinal vertebra.

FIG. 11 shows an X-Ray of an implant through a spinal vertebra. The screw or wire threaded insert 64 is threaded into the vertebra 60. The threaded insert 64 is screwed from the head 62 of the screw or abutment.

Figure 12:
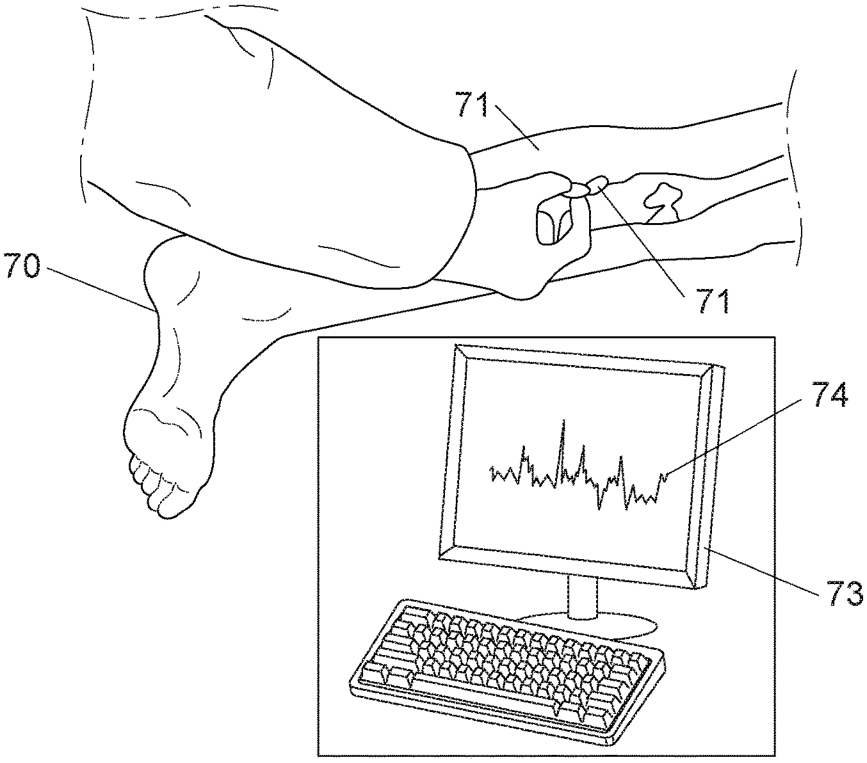
FIG. 12 Prior Art
FIG. 12 shows an Electromyogram.

FIG. 12 shows an electromyogram. In the case of limb replacement on an abutment, the body has still lost the ability to control the lost limb or digit. Electromyogram allows for sampling data from nerves 72 that control muscles 71 to control a foot 70 or other body part. The signal to/from the nerves 72 can be detected and shows on a computer 73 display 74. The nerves can be monitored and can be used to create a replacement limb, hand, or digit.

Figure 13:
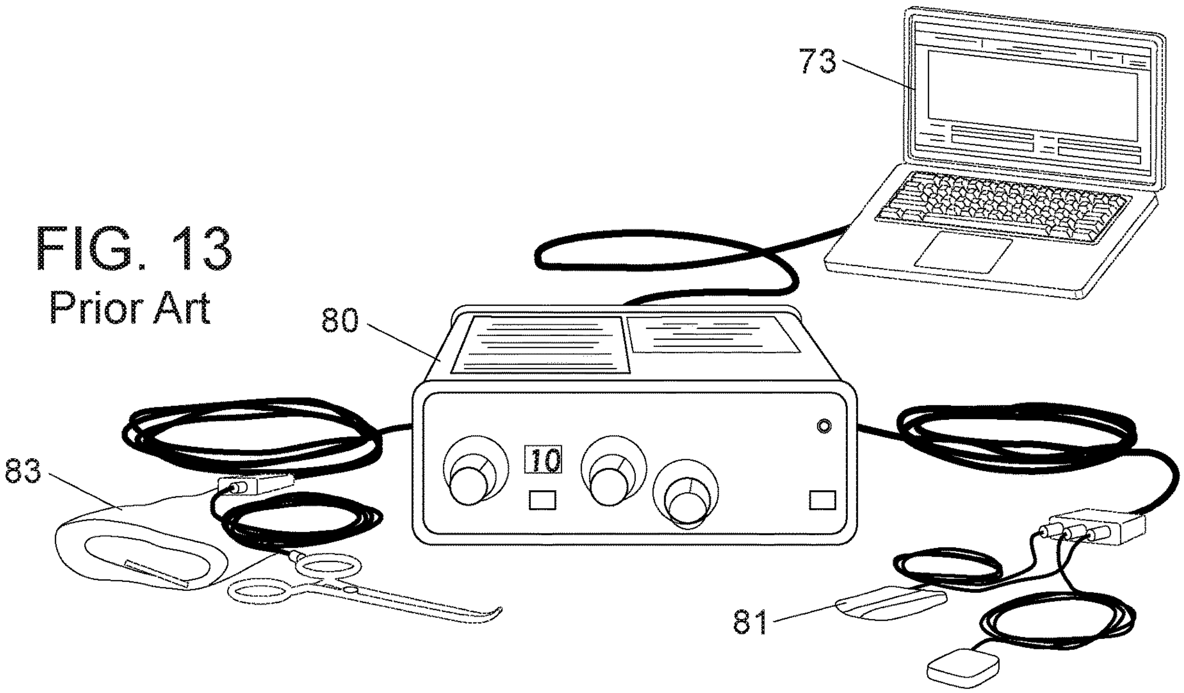
FIG. 13 Prior Art
FIG. 13 shows a nerve stimulator and an electromyographic (EMG) monitor.

FIG. 13 shows a nerve stimulator and an electromyographic (EMG) monitor. This device combines a nerve simulator 81 and an electromyographic (EMG) monitor into an integrated surgical tool. A surgical instrument is enhanced to become a monopolar probe 83 the continuously applies a stimulation pulse to soft tissue while the EMG monitor detects, interprets and records muscle response evoked by stimulation. Once an evoked EMG is identified. Device 80 produces an audio alarm allowing a surgeon to maintain attention on the surgical field. A computer can also be connected to display 73 the signal. This device 80 significantly reduces nerve location time while improving patient safety and decreasing surgeon stress during difficult dissections.

Figure 14:
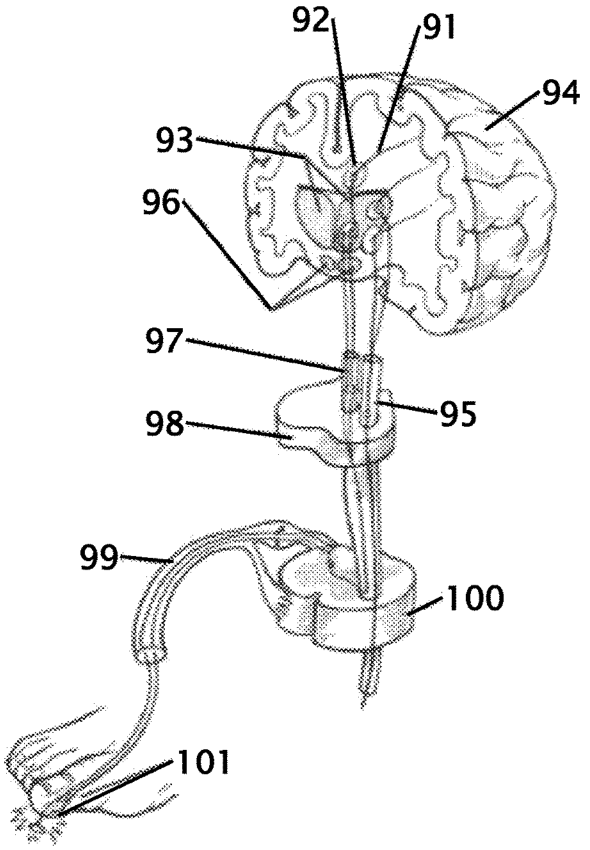
FIG. 14 Prior Art
FIG. 14 shows a block diagram of the nervous system detection of pain.

It is contemplated that a conductive plate with a plurality of contacts can be brought in contact with nerves in the remaining limb or spine. The plurality of contacts can be monitored and processed by a computer and then using a microcontroller or VLSI to convert the data from the plurality of contacts to operate mechanical muscles. VLSI circuit programmed to convert analog neurological electrical impulses into a digital protocol for activating a robotic prosthetic. A standardized source code OS is public access as befits the numerous neurorobotic prosthetics and products extending even into cybernetic enhancement, zero-gravity, cosmetic animatronic jewelry, 3D tattoos, entertainment costuming etc. Sensors on the replacement prosthetic can also send signals back through the plurality of contacts to provide feedback to the nervous system to the brain of a person 90. FIG. 14 shows a block diagram of the nervous system detection of pain. This figure shows the pain receptors 101 sends signal through the spinal nerve 99 and into the spinal cord 100. The signal then passes through the brain stem 98 through the neospinothalamic pathway 95 and the paleospinothalamic pathway 97. The hypothalamus 96 transfers the signal to the thalamus 93, where the signal is interpreted by the limbic forebrain 92 to the cerebral cortex 91 in the cerebrum 94.

A static rigid bolted mounted receiver wire thread insert and abutment for a standard prosthetic. An internal/external abutment which allows for surrounding residual muscle to be attached and used to activate mechanical prosthetic appendage. An internal/external abutment containing, a contact plate with sufficient gold contact points to attach residual nerve endings, during implanting surgery with assist from Nerveana by Medivison Ventura, Ca. nerve identification, send, receive, target to exploit proprioceptive memory or retraining.

Figure 15:
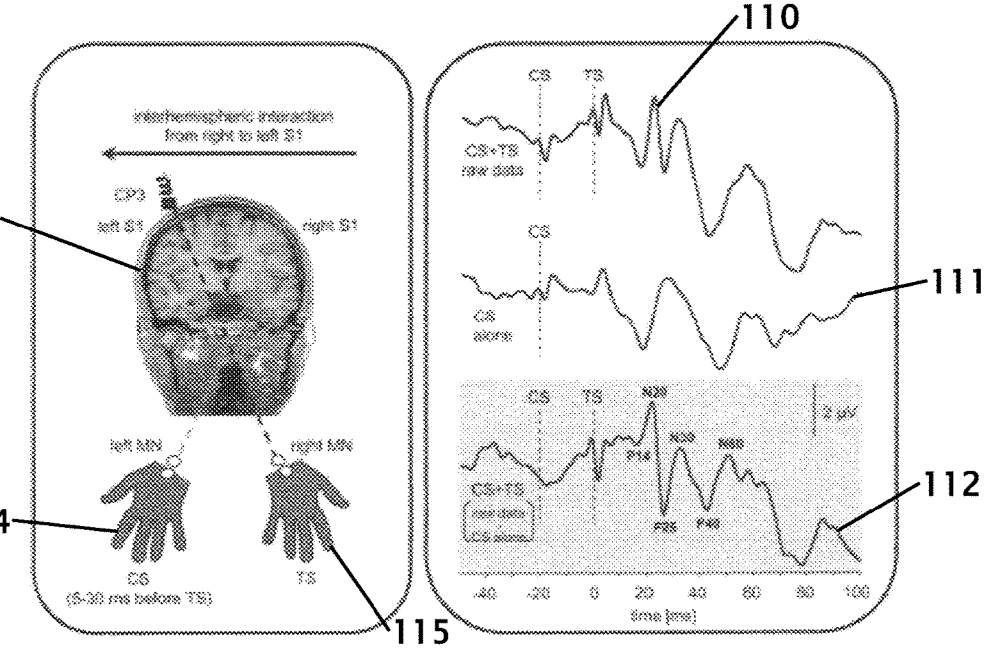
FIG. 15 Prior Art
FIG. 15 shows a graphical representation of nerve sensory detection.

FIG. 15 shows a graphical representation of nerve sensory detection. In this figure the sensory input from the left hand 114 (CS) and the right hand 115 (TS) is transmitted to the brain 94. The graph shows the raw CS+TS data 110, the CS data alone 111 and the new response 112 to the stimuli as a function of time.

Figure 16:
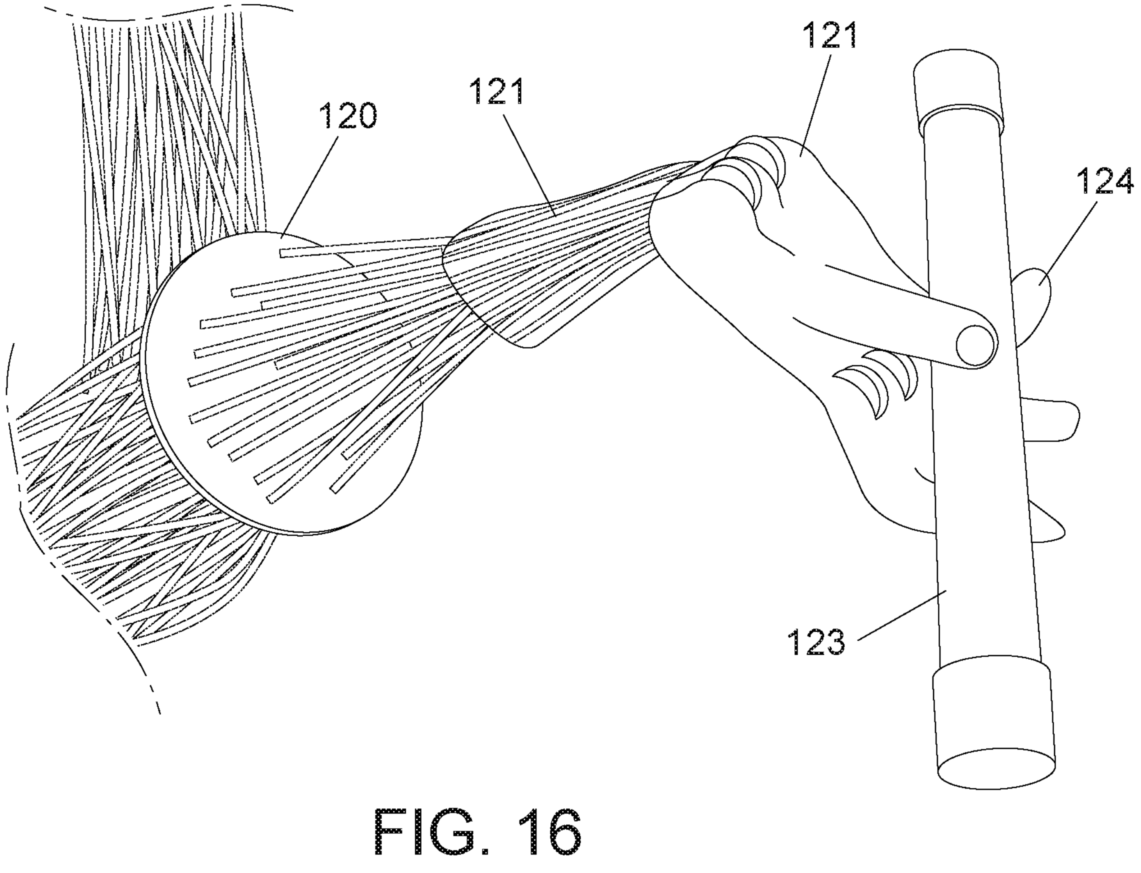
FIG. 16 Prior Art
FIG. 16 shows a robotic interface from a sensory and muscle interface.

FIG. 16 shows a robotic interface from a sensory and muscle interface. Surgical robots, micro-nanorobotics, soft robotics, industrial robotics, humanoid robotics, neuro-robotics, prosthetics, neural engineering, rehabilitation engineering, bio-inspired robotics, biomedical signal processing, marine robotics, service robotics and ambient assisted living, educational robotics, and their ethical, legal, social, and economic implications. The BioRobotics Institute is an integrated system aimed at innovation research, education, and technology transfer, and it intends to create new companies in high tech sectors.

Soft Robotics which imitates biological tissue and function, is capable of said function(s) which rigid structure cannot achieve.

The growing need for robots in service tasks, in unstructured environments, in contact with humans, is leading to the release of the basic assumption of rigid parts in robotics. The role of soft body parts appears clear in natural organisms, to increase adaptability and robustness. Compliance, or softness, are also needed for implementing the principles of embodied intelligence, or morphological computation, a modern view of intelligence, attributing a stronger role to the physical body and its interaction with the environment. One simple example would imitate an octopus tentacle or tadpole tail.

The "Micro-Nano-Bio Systems and Targeted Therapies" Lab has the mission of studying phenomena at the Mill-, Micro- and nanoscale, to invent new solutions and to engineer processes at such scales, to develop advanced technological components and the enable minimally invasive therapies. A high level of interdisciplinary features the group, whose research efforts are at the edge between robotics micro-mechanics, materials science, and molecular biology. The limb replacement in this figure has a base control module 120 with a replacement arm 121, wrist 122 and digits 124. This robotic forearm can lift and sense load 123 to provide the proper grasp force. Sensory inputs on the fingers 124 provide feedback on grip force and can further provide sensory information regarding temperature and surface texture.

There are several organizations such as, but not limited to Meridan which is a European Commission through the Seventh Framework Programme that is working with carbon-based biomimetics interfaces for innovative neuroprosthetics. Organizations working in this area with a goal to optimize novel electrode technologies, using nanobiology and cellular physiology, integrated within nanodiamond materials processing towards a new generation of high-resolution chronic implants, with high stability and low biofouling. The application of diamond technology innovated the current bionic devices and provides them with advanced functionalities, better performance, and higher market impact towards preclinical stage testing.

Integrated knowledge on nanomaterials, electrode design, and electronics are used to design devices operating in vivo, with sensory and motor neural signals for bi-directional biomimetic interfaces. This works towards advanced voluntary control prosthetics and nerve regeneration.

The drive is towards high degrees of freedom prosthetic actuators in man-machine interfaces, using the developed devices in combination with minimally invasive surgery. The goal is a high-resolution ENG and neuromuscular amplification.

There is further reduced discomfort such as heat, sweating and chafing. Patients experience improved sensory feedback because the phenomenon of sensation through the bone (Osseo perception) is present. This type of integration is adaptable to thumb amputation where no other integration provides the Osseo perception to the hand and wrist.

Thus, specific embodiments of a dental/prosthetic implant have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A dental implant system comprising:

a tapered conical wire threaded insert having a first end that is configured to receive a stud welded onto a base made from a magnetic material;

said tapered conical wire threaded insert has a mid-section that is configured for insertion in a bone;

said tapered conical wire threaded insert having a central area that is configured to receive a spansule;

said tapered conical wire threaded insert has a second end where a magnetic shock absorber is threaded to the second end;

said magnetic shock absorber has two internal magnets configured in a repelling configuration;

said magnetic shock absorber having a second end with a mounting base that is configured to pass through a gumline with said magnetic shock absorber existing in said bone under said gumline;

said mounting base having a threaded hole;

a fastener extending through a crown and into said threaded hole in said mounting base;

said magnetic shock absorber provides limited cushioned movement of said crown from forces that squeeze said two internal magnets together, and said limited cushioned movement pumps time-released medication from said spansule.

2. The dental implant system according to claim 1, wherein said wire threaded insert is fabricated from titanium.

3. The dental implant system according to claim 2, wherein said titanium is nanostructured.

4. The dental implant system according to claim 1, wherein said tapered conical wire threaded insert is at least partially coiled and configured to be threaded into a tapped hole in a bone.

5. The dental implant system according to claim 4, wherein said tapered conical wire threaded insert expands with said tapped hole.

6. The dental implant system according to claim 1, further includes an anti-rotation ribs or shape that prevents rotation of said crown relative to said tapered conical wire threaded insert.

7. The dental implant system according to claim 1, wherein said tapered conical wire threaded insert is square in cross-section.

8. The dental implant system according to claim 1, wherein said mounting base is selected from a group consisting of an aesthetic abutment, an angled contoured abutment, a ball attachment abutment, a casting abutment, a full contour abutment, a gold castable abutment, a plastic castable abutment, an angled abutment, a healing abutment, a lab analogs abutment, a multi-unit abutment, a plastic non-engaging castable abutment, a plastic temporary abutment, a screw receiving abutment, an angled screw receiving abutment, a straight contoured Zirconia or Titanium abutment, a straight snap-on abutment and a transfer abutment.

9. The dental implant system according to claim 1, wherein the tapered conical wire threaded insert is a medical-grade titanium alloy containing a measured amount of iron for extra strength and susceptibility to magnetic attraction.

10. The dental implant system according to claim 1, wherein said base is a medical grade iron alloy titanium and is chemically welded to said stud.

11. The dental implant system according to claim 1, wherein the said threaded hole in said mounting base is a wire threaded insert.

12. The dental implant system according to claim 1, wherein said mounting base is configured to move through gums in a mouth.

13. The dental implant system according to claim 1, wherein the crown has a countersunk hole.

14. The dental implant system according to claim 13, wherein said fastener has a hex head that countersinks into said crown.

15. The dental implant system according to claim 1, wherein said repelling configuration provides increased repelling force as said two internal magnets are pushed together.

16. The dental implant system according to claim 1, wherein said tapered conical wire threaded insert is configured to Osseo integrate into said bone.

17. The dental implant system according to claim 1, wherein said magnetic shock absorber has at least one venturi hole whereby said medication from said spansule is configured to pass through.

* * * * *